United States Patent [19]

Clements

[11] 3,866,135
[45] Feb. 11, 1975

[54] REVERSING CONTROLLER
[75] Inventor: Ralph E. Clements, Loves Park, Ill.
[73] Assignee: Barber-Colman Company, Rockford, Ill.
[22] Filed: Sept. 12, 1973
[21] Appl. No.: 396,511
    Related U.S. Application Data
[63] Continuation of Ser. No. 249,910, May 3, 1972, abandoned.
[52] U.S. Cl. ............... 330/51, 330/185, 330/30 D, 330/69
[51] Int. Cl. ............................................. H03f 1/14
[58] Field of Search ....... 330/149, 9, 185, 51, 30 D, 330/69; 307/240

[56]          References Cited
           UNITED STATES PATENTS
1,988,960   1/1935   Ports ................................. 330/185
2,857,562  10/1958   Venrath ............................ 330/9 X
2,874,235   2/1959   Harturg et al. ................... 330/9
2,970,276   1/1961   Dollinger ......................... 330/149 X Primary Examiner—Nathan Kaufman
Attorney, Agent, or Firm—A. Richard Koch

[57]          ABSTRACT

A single-pole, double-throw switch couples an input voltage alternatively to either of two input terminals of an amplifier, each of the input terminals being supplied with substantially equal bias voltages, whereby the output of the amplifier may be reversed in relation to the input voltage by the switch coupling said input voltage to one or the other of the input terminals.

10 Claims, 2 Drawing Figures

PATENTED FEB 11 1975                                                           3,866,135

REVERSING CONTROLLER

This is a continuation of application Ser. No. 249,910, filed May 3, 1972, now abandoned.

BACKGROUND OF THE INVENTION

This invention is concerned with an electric circuit means wherein a variable electric voltage is applied alternatively to one or another input terminal of an electrical amplifying device to control a source of electrical energy applied to the same device and from which is derived an output signal of substantially the same wave form as the input signal and substantially linearly related thereto.

In a closed loop multi-zone heating and cooling system, a single pipe delivers either hot or chilled water to radiators depending upon whether it is a heating or cooling season. Not all of the zones require the same amount of heating or cooling, so separate temperature controls are provided for each zone. These temperature controls operate valves controlling flow of the water through the controlled radiators or to operate dampers admitting air over or diverting it from the radiators. In either case, when the zone temperature deviates from the set point in a sense that may be corrected by the water being delivered, the control must operate the valve or damper in the same direction whether hot or chilled water is being delivered. Such valve or damper operation requires that the control of the valves or dampers be reversed when the temperature of the delivered water is changed between hot and chilled condition. When this reversal is accomplished in an electrical circuit, it is necessary to reverse either the input or the output of the control and, until Tveit in U.S. Pat. No. 3,377,545, issued on Apr. 9, 1968, disclosed how this could be accomplished by a single-pole, double-throw switch selecting one of two opposite outputs in the output circuit, reversal was accomplished by a double-pole, double-throw switch. Double-pole, double-throw switches are frequently unreliable due to poor contact being made and they are relatively expensive, especially when they are automatically operated in response to the water temperature.

SUMMARY OF THE INVENTION

According to the teachings of this invention, the output of an amplifier is reversed by a single-pole, double-throw switching means in the input circuit to the amplifier, which has only one output. Reversal of the output may take any one of several forms, such as a reversal of polarity, or a reversal of the periods of time during which there is a modulated output and no output.

DESCRIPTION OF THE PREFERRED EMBODIMENTS

Figure 1:
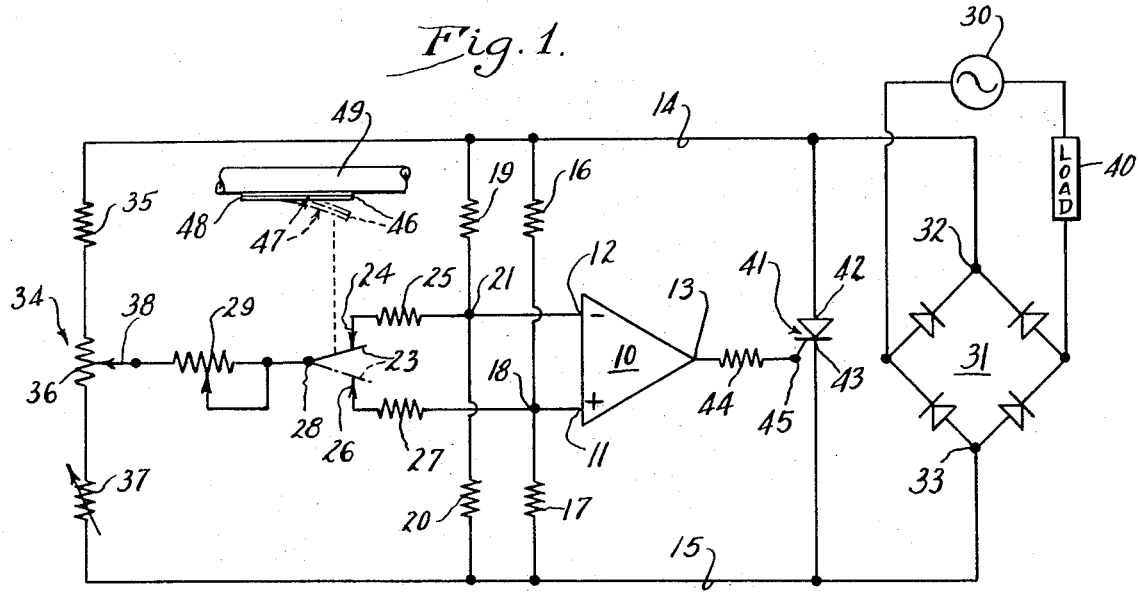
FIG. 1 is a schematic circuit diagram of a preferred embodiment of this invention and its use in one application.

In the preferred embodiment of FIG. 1, a differential input operational amplifier in the form of an integrated circuit 10 has a non-inverting input terminal 11, an inverting input terminal 12 and an output terminal 13. A pair of conductors 14, 15 deliver power to the control circuit. A pair of series bias resistors 16, 17, connected between the conductors 14, 15, provide at their junction 18 a bias voltage for the non-inverting input terminal 11. Another pair of series bias resistors 19, 20, also connected between the conductors 14, 15, provide at their junction 21 a bias voltage for the inverting input terminal 12. A single-pole, double-throw switch 23 has one alternate terminal 24 connected through an input resistor 25 to the summing junction 21 and the other alternate terminal 26 connected through an input resistor 27 to the summing junction 18 so that the input signal to common terminal 28 may be delivered selectively to either of the summing junctions 21, 18 through a respective one of the input resistors 25, 27. A proportioning band potentiometer 29 connected to the common terminal 28 permits adjustment of the proportioning band of the amplifier regardless of which summing junction is selected to receive the input signal.

As shown, power from an alternating current source 30, the current from which is rectified in a rectifier bridge 31, is delivered to conductors 14, 15 at the positive and negative terminals 32, 33 respectively. The input signal is shown as provided by a condition sensitive voltage divider 34 comprising a resistor 35, a set point potentiometer 36, and a condition variable resistance 37, such as a thermistor, connected in series between the conductors 14, 15 and having a tap, shown as the wiper 38 of potentiometer 36, connected to provide the input signal to the common terminal 28 through the proportioning band potentiometer 29. The load 40 is connected in a series circuit with the alternating current source 30 and a control device, shown as a silicon controlled rectifier 41, hereinafter referred to as an SCR. The SCR has its anode 42 connected to the positive conductor 14, and its cathode 43 connected to the negative conductor 15, so that, when it is rendered conducting, a circuit is completed from the power source 30 through the bridge 31, the SCR 41, the bridge 31 and load 40 back to the power source 30. The SCR 41 is rendered conductive, or fired, by an output signal delivered from output terminal 13 through an output resistor 44 to the gate 45 of the SCR.

In the operation of the embodiment of FIG. 1, a pulsating direct current is supplied to conductors 14, 15 from the alternating current power source 30 through the rectifier bridge 31. The SCR 41, when conducting, substantially shorts the control circuit between conductors 14, 15 and passes the current required to energize the load 40. When the SCR is non-conducting, the control circuit is energized but there is insufficient current to energize the load 40. Series resistors 16, 17 and 19, 20 between conductors 14, 15 form voltage dividers to supply bias voltages at bias taps, shown as junctions 18, 21, to the non-inverting input terminal 11 and the inverting input terminal 12 respectively. These bias voltages are usually equal in value. The resistor 35, the set point potentiometer 36 and the condition sensitive resistance 37 are so selected in value that, with the controlled condition at the set point value, the input signal voltage at wiper 38 is equal to the bias voltage at the summing point 18 or 21 to which it has been selectively connected through the switch 23. While this condition prevails, no current flows through the proportioning band potentiometer 29, the switch 23 and the input resistors 25, 27, leaving only the equal bias voltages to be applied to the input terminals 11, 12, thus producing no output signal voltage at output terminal 13 and leaving the SCR 41 in non-conducting state.

Let us assume that the switch 23 is in the position shown by the solid line in FIG. 1 and that the sensed condition departs from set point value in a direction to decrease the impedance of resistance 37. The input signal voltage at wiper 38 will then be less than the bias voltage applied to the summing junction 21, resulting in an input current being drawn from the summing junction 21 to the wiper 38. The amount of input current so drawn depends upon the combined resistance values of the input resistance 25 and that part of the proportioning band potentiometer 29 through which it flows, and can be increased or decreased by reducing or enlarging the part of the proportioning band potentiometer 29 through which it flows. This input current is supplied through bias resistor 19, resulting in an increased voltage drop through the resistor, and a lower voltage at summing junction 21 supplied to the inverting terminal 12 than the bias voltage supplied to the non-inverting terminal 11. A positive output signal voltage will then appear at output terminal 13 and increase to saturation in well known manner, acting as a switch to pass an output current through output resistor 44 and from gate 45 to cathode 43 through SCR 41 to conductor 15, rendering the SCR conductive and so energizing the load 40, usually a means for returning the sensed condition to set point value. If the sensed condition had instead departed from set point value in a direction to increase the impedance of resistance 37, the input signal voltage at wiper 38 would have been greater than the bias voltage applied to summing junction 21, and input current would flow into the summing junction 21 and through bias resistor 20 to increase the voltage at summing junction 21 supplied to inverting input terminal 12. A negative output signal voltage would then appear at output terminal 13 and increase to saturation, but no output current would flow, since the gate 45 — cathode 43 junction of the SCR 41 would be back biased, and the SCR would remain in non-conducting state.

Let us now assume that switch 23 is in the position shown by the dashed line in FIG. 1 and that the sensed condition departs from set point value in a direction to decrease the impedance of resistance 37. The input signal voltage at wiper 38 will be less than the bias voltage applied to the summing junction 18, resulting in an input current being drawn from summing junction 18 to the wiper. The input current is supplied through bias resistor 16, resulting in an increased voltage drop through the resistor 16 and a lower voltage at the summing junction 18 supplied to the non-inverting terminal 11. A negative output signal voltage will then appear at output terminal 13 and the SCR 41 will remain in non-conducting state. If the sensed condition had departed from set point value in a direction to increase the impedance of the resistance 37, the input signal voltage at wiper 38 would have been greater than the bias voltage applied to summing junction 18, and input current would flow into the summing junction 18 and through bias resistor 17 to increase the voltage at summing junction 18 supplied to non-inverting input terminal 11. A positive output signal would then appear at output terminal 13, output current would flow through the SCR 41 from gate 45 to cathode 43, rendering the SCR conductive and so energizing the load 40.

It will be seen that the single-pole, double-throw switch 23 reverses the relative polarities of the voltages applied to the input terminals 11, 12 and therefore the polarity of the output voltage. When there is a negative or no output voltage produced at output terminal 13, the SCR 41 is not fired and the firing circuit draws insufficient current from the power source 30 to energize the load 40. When a positive output voltage is produced at output terminal 13, the SCR 41 is fired and shorts out the firing circuit while energizing the load 40. The shorting of the firing circuit causes no trouble, since the SCR 41 continues to conduct until the voltage applied from anode 42 to cathode 43 is reduced to substantially zero, as at the end of each half cycle.

In one application the condition variable resistance 37 is temperature sensitive and is exposed to room temperature. The switch 23 is operated by the free end 46 of a bimetal 47 strapped at the other end 48 to a pipe 49 delivering either hot or chilled water to radiators (not shown) in the room. The load 40 comprises an electrically controlled valve controlling flow of the water from the pipe 49 through the radiator. When hot water is present in pipe 49, the free end 46 moves the switch 23 to its solid line position, so that, if the room temperature rises above set point, the resistance 37 increases its impedance, the input voltage at tap 38 increases, raising the voltage at summing junction 21 and inverting input terminal 12 above the reference voltage at the non-inverting input terminal 11 to produce a negative voltage at output terminal 13, resulting in the SCR 41 remaining in non-conducting state, so that the valve is closed. If the room temperature falls below the set point, the resistance 37 decreases its impedance, the input voltage at tap 38 decreases, dropping the voltage at summing junction 21 and inverting input terminal 12 below the reference voltage at the non-inverting input terminal 11 to produce a positive voltage at output terminal 13, resulting in the SCR 41 becoming conductive to open the valve, permitting hot water to flow from pipe 49 through the radiator and so raise room temperature toward set point. When chilled water is present in pipe 49, the free end 46 moves the switch 23 to the dashed line position, so that, if the room temperature rises above the set point, the resistance 37 increases its impedance, the input voltage at tap 38 increases, raising the voltage at summing point 18 and the non-inverting input terminal 11 above the reference voltage at inverting terminal 12 to produce a positive voltage at output terminal 13, resulting in the SCR 41 becoming conductive to open the valve, permitting chilled water to flow from pipe 49 through the radiator and so reduce room temperature toward the set point. If the room temperature falls below set point, the resistance 37 decreases its impedance, the input voltage at tap 38 decreases, dropping the voltage at summing junction 18 and non-inverting input terminal 11 below the reference voltage at inverting input terminal 12 to produce a negative voltage at output terminal 13, resulting in SCR 41 remaining in non-conducting state, so that the valve is closed. It will be noted that the valve is opened only when the temperature of the water in pipe 49 is such as to permit temperature correction in the room. It will be obvious that the invention is applicable to many similar applications as well.

It will be recognized that the circuit described is an on-off controller. By adding a negative feedback in well known manner, the amplifier would provide an output voltage proportional to the difference between the summed and reference voltages applied to the inverting and non-inverting input terminals 11, 12 and become a phase angle firing controller. If a diode were inserted in series with the output terminal 13, a triac could be controlled similarly to the SCR 41. It is not necessary that the power supply for the control circuit be common to the power supply for the load, in which event, by substituting a transistor in well known manner for the SCR 41, a modulating controller could be provided.

Figure 2:
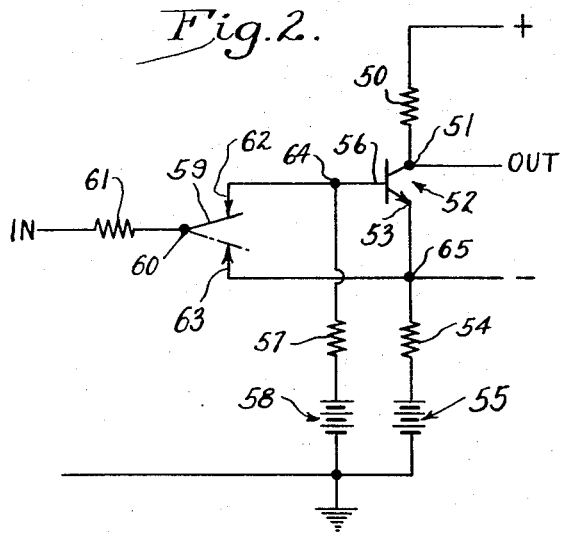
FIG. 2 is a schematic circuit of another embodiment of the invention.

FIG. 2 demonstrates some of the variations possible within the scope of this invention. The positive (+) terminal of a direct current power supply is connected through a load resistor 50 to the collector 51 of an NPN transistor 52. The negative (−) terminal is connected to the emitter 53, so that the output voltage at the "Out" terminal, connected to the collector 51, is modulated according to the degree of conductivity of the transistor 52. The emitter 53 is connected through a bias resistor 54 to a source of emitter bias voltage 55, shown as a battery. The base 56 of transistor 52 is connected through a bias resistor 57 to a source of base bias voltage 58, also shown as a battery. A single-pole, double-throw switch 59 has its common terminal 60 connected through an input resistor 61 to receive an input voltage from the "In" terminal. One alternate terminal 62 of switch 59 is connected to the base 56 of transistor 52, while the other alternate terminal 63 is connected to the emitter 53. Since the transistor 52 is employed in the common emitter configuration, the base 56 and the emitter 53 are the input terminals. The base bias voltage would usually be slightly higher than the emitter voltage drop, but such a condition is not necessary. Ordinarily with only the bias voltages applied to the base 56 and emitter 53, the transistor 52 will not conduct and the output voltage is the same as the voltage at the positive (+) terminal. With the switch 59 in the position indicated by the solid line, an input voltage above the base bias voltage will increase the base voltage at summing junction 64. If the base voltage is above the emitter bias voltage (ignoring the base-emitter voltage drop) to produce a base current from junction 64 through the transistor 52 (from base 56 to emitter 53) to junction 65, the transistor 52 will become conductive from collector 51 to emitter 53 in proportion to the amplitude of the base current. The resulting load current from the positive (+) terminal through load resistor 50 and transistor 52 (from collector 51 to emitter 53) to the negative (−) terminal will produce a voltage drop proportional to the load current in the load resistor 50, lowering the output voltage at the "Out" terminal by that voltage drop from the positive (+) terminal voltage. The output voltage therefore varies reversely in proportion to the base current. If the input voltage were below the base bias voltage, the base voltage would be reduced. When the base voltage is at or below the emitter bias voltage, no base current will be produced and the transistor will be in non-conducting state. With the switch 59 in the dasked line position an input voltage above the emitter bias voltage will increase the emitter voltage at summing junction 65. When the emitter voltage is equal to or higher than the base bias voltage (ignoring the base-emitter voltage drop), the base-emitter junction is back-biased and the transistor 52 will be in its non-conducting state. If the input voltage is lower than the emitter bias voltage, the emitter voltage will be reduced. When the emitter voltage is less than the base bias voltage, a base current will render the transistor 52 conducting, again producing an output voltage modulated reversely in proportion to the base current. It will be seen that the single-pole, double-throw switch 59 once again reverses the relative polarities of the voltages applied to the input terminals, but in this embodiment it reverses the time periods during which the output voltage is modulated and unmodulated.

The embodiments described are merely examples of the invention, which is limited only by the claims.

I claim:

1. A control circuit comprising an amplifier having first and second input terminals and an output terminal, a pair of conductors for connection to a power source, a first series resistance circuit connected between said conductors and having a first tap coupled to the first input terminal, a second series resistance circuit connected between said conductors and having a second tap coupled to the second input terminal, a voltage divider connected between said conductors and having a third tap, a variable condition sensor in the voltage divider to provide a condition variable voltage signal at said third tap, and means for selectively coupling said third tap to a selected one of the input terminals, whereby an output signal produced at the output terminal may be reversed with respect to said condition variable voltage signal.

2. A control circuit according to claim 1 wherein said selective coupling means comprises a double-throw switch having a common terminal connected to said third tap, a first alternate terminal connected to the first input terminal, and a second alternate terminal connected to the second input terminal.

3. A control circuit according to claim 2 additionally comprising a thermostatic means for operating said switch, said means having a hot position and a chilled position, whereby a circuit is closed between the common terminal and one of said alternate terminals by the thermostatic means in said hot position and an alternate circuit is closed between the common terminal and the other of said alternate terminals by the thermostatic means in said chilled position.

4. A control circuit according to claim 1 wherein said first and second taps provide substantially equal bias voltages to the input terminals.

5. A control circuit according to claim 1 wherein said condition sensor is a thermal sensor.

6. A control circuit according to claim 1 additionally comprising a control device connected between the conductors to control energization of a load and having a gate connected to receive the output signal.

7. A control circuit according to claim 1 additionally comprising rectifier means between said conductors and the power source.

8. A control circuit according to claim 1 wherein said third tap comprises a wiper on a set point potentiometer in the voltage divider.

9. A control circuit according to claim 1 additionally comprising a resistor between said third tap and said selected one of the input terminals.

10. A control circuit according to claim 1 wherein said amplifier is an integrated circuit operational amplifier, said first input terminal is an inverting input terminal is a non-inverting input terminal.

* * * * *

UNITED STATES PATENT OFFICE
CERTIFICATE OF CORRECTION

Patent No. 3,866,135　　　　　　　　　Dated February 11, 1975

Inventor(s)　Ralph E. Clements

It is certified that error appears in the above-identified patent and that said Letters Patent are hereby corrected as shown below:

Column 6, line 66, after "nal" insert --and the second input terminal--.

Signed and sealed this 29th day of April 1975.

(SEAL)
Attest:

RUTH C. MASON
Attesting Officer

C. MARSHALL DANN
Commissioner of Patents
and Trademarks